United States Patent
Bai et al.

(10) Patent No.: US 9,444,585 B2
(45) Date of Patent: *Sep. 13, 2016

(54) HYBRID AUTOMATIC REPEAT REQUEST WITH FEEDBACK DEPENDENT BIT SELECTION

(71) Applicant: Telefonaktiebolaget L M Ericsson (publ), Stockholm (SE)

(72) Inventors: Chunlong Bai, Kanata (CA); Bo Göransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/814,569

(22) Filed: Jul. 31, 2015

(65) Prior Publication Data

US 2015/0341146 A1    Nov. 26, 2015

Related U.S. Application Data

(63) Continuation of application No. 13/405,250, filed on Feb. 25, 2012, now Pat. No. 9,130,748.

(51) Int. Cl.
*H04L 1/16* (2006.01)
*H04L 5/00* (2006.01)
*H04B 1/7103* (2011.01)
(Continued)

(52) U.S. Cl.
CPC ........... *H04L 1/1671* (2013.01); *H04B 1/7103* (2013.01); *H04L 1/0068* (2013.01); *H04L 1/1819* (2013.01); *H04L 1/1864* (2013.01); *H04L 5/0053* (2013.01); *H04B 2201/7071* (2013.01); *H04B 2201/709709* (2013.01); *H04L 1/0026* (2013.01); *H04L 1/0057* (2013.01)

(58) Field of Classification Search
CPC ..... H04L 1/1671; H04L 1/1819; H04L 1/18; H04L 1/0013; H04L 1/0052; H04L 1/0054; H04L 1/0055; H04L 1/0057; H04L 1/0059; H04L 1/0066; H04L 1/0069; H04L 1/165; H04L 1/00; H04L 1/1864; H04L 1/0026; H04L 1/0068

See application file for complete search history.

(56) References Cited

U.S. PATENT DOCUMENTS 7,362,733 B2 * 4/2008 Kim ..................... H04L 1/0003 370/203
7,853,853 B2   12/2010 Demirhan et al.
(Continued)

OTHER PUBLICATIONS

Li, S. et al., "Automatic-Repeat-Request Error-Control Schemes", IEEE Communications Magazine, Dec. 1, 1984, pp. 5-17, vol. 22, Issue 12, IEEE Communications Society.
(Continued)

*Primary Examiner* — Hirdepal Singh
(74) *Attorney, Agent, or Firm* — Coats & Bennett, PLLC

(57) ABSTRACT

A multi-bit HARQ feedback is transmitted by a receiver to a transmitter. The multi-bit feedback is a function of a level of convergence reached by a decoder when the previously transmitted coded data bits were decoded. The transmitter is configured to select a set of coded data bits for a retransmission as a function of the multi-bit feedback. In some embodiments, different redundancy versions of the coded data bits may be selected as a function of the multi-bit feedback. In other embodiments, a bit puncturing or bit repetition pattern may be selected as a function of the multi-bit feedback.

22 Claims, 6 Drawing Sheets

(51) Int. Cl.
*H04L 1/18* (2006.01)
*H04L 1/00* (2006.01)

(56) References Cited

U.S. PATENT DOCUMENTS

| | | | |
|---|---|---|---|
| 2001/0039638 A1 | 11/2001 | Gueguen et al. | |
| 2007/0016838 A1* | 1/2007 | Mielczarek | H04L 1/0013 714/749 |
| 2009/0086845 A1* | 4/2009 | Demirhan | H04L 1/0003 375/295 |
| 2010/0046481 A1* | 2/2010 | Chen | H04W 52/265 370/335 |
| 2010/0091734 A1 | 4/2010 | Park et al. | |
| 2012/0106413 A1* | 5/2012 | Huang | H04L 1/0079 370/310 |
| 2013/0329678 A1 | 12/2013 | Pan et al. | |
| 2014/0376358 A1* | 12/2014 | Eder | H04L 1/1845 370/216 |

OTHER PUBLICATIONS

Bai, C., "Improved forward error control decoding and hybrid ARQ techniques for wireless systems", Ph.D. Thesis, Mar. 1, 2008, pp. 1-140, University of Alberta, Canada.

Shea, J., "Reliability-Based Hybrid ARQ", IEEE Electronics Letters, Jun. 20, 2002, pp. 644-645, vol. 38, No. 13, IEEE.

Wozencraft, J. et al., "Coding for Two-Way Channels", Technical Report 383, Jan. 3, 1961, pp. 1-16, Massachusetts Institute of Technology, Cambridge, Massachusetts, USA.

Kallel, S., "Complementary Punctured Convolutional (CPC) Codes and Their Applications", IEEE Transactions on Communications, Jun. 1, 1995, pp. 2005-2009, vol. 43, Issue 6, IEEE.

Hagenauer, J., "Rate Compatible Punctured Convolutional Codes", IEEE International Conference in Communications, 1987, pp. 1032-1036, IEEE.

Hagenauer, J., "Rate-Compatible Punctured Convolutional Codes (RCPC Codes) and their Applications", IEEE Transactions on Communications, Apr. 1, 1988, pp. 389-400, vol. 36, Issue 4, IEEE.

Rowitch, D., "On the Performance of Hybrid FEC/ARQ Systems Using Rate Compatible Punctured Turbo (RCPT) Codes", IEEE Transactions on Communications, Jun. 1, 2000, pp. 948-959, vol. 48, Issue 6, IEEE.

Bai, C. et al., "Hardware Implementation of Log-MAP Turbo Decoder for W-CDMA Node B with CRC-Aided Early Stopping", Conference publication, IEEE 55th Vehicular Technology Conference, 2002, pp. 1016-1019, vol. 2, IEEE.

Wicker, S., "Error Control Systems for Digital Communication and Storage", Jan. 1, 1995, pp. 409-422, Chapter 15.3-15.4, Prentice-Hall, Upper Saddle River, NJ, USA.

* cited by examiner

HYBRID AUTOMATIC REPEAT REQUEST WITH FEEDBACK DEPENDENT BIT SELECTION

CROSS-REFERENCE TO RELATED APPLICATIONS

This application is a continuation of U.S. patent application Ser. No. 13/405,250, filed Feb. 25, 2012, which is hereby incorporated by reference as if fully set forth herein.

BACKGROUND

The present invention relates generally to retransmission protocols for wireless communication systems and, more particularly, to the selection of retransmission parameters for hybrid automatic repeat request operations in wireless communication systems.

High-Speed Downlink Packet Access (HSDPA) for Wideband Code Division Multiple Access (WCDMA) and Long Term Evolution (LTE) networks use Hybrid Automatic Repeat Request (HARQ) at the physical layer to mitigate errors that occur during transmission of data. In HARQ, error detection bits or check bits are added to information bits to be transmitted. The information bits with the added error detection bits are then coded using a forward error correction code to obtain a block of coded data bits. The transmitter transmits a portion of these coded bits to the receiver in an initial transmission. The receiver decodes the received bits and uses the error detection bits to check for uncorrected errors. If the received data block is successfully decoded, the receiver sends a positive acknowledgement (ACK) to the transmitter over a reverse control channel. If the received data block is not correctly decoded, the receiver can request a retransmission by sending a negative acknowledgement (NACK) to the transmitter over a reverse control channel.

In conventional HARQ operations, a single acknowledgement bit is sent from the receiving terminal to the transmitting terminal to indicate whether the transmitted data packet was correctly decoded. Typically, a "1" is transmitted to indicate successful decoding and a "0" is sent to indicate a decoding failure and to request a retransmission. The ACK/NACK informs the base station whether the data packet was correctly received by the user terminal. If the data packet is correctly received by the user terminal, the base station can proceed with the transmission of new data packets. In the event that the data packet is not correctly received by the user terminal, the base station may either repeat the original transmission or send additional coded data bits, which may be combined with the previously transmitted data bits prior to decoding. Sending additional coded data bits lowers the effective coding rate and increases the probability that the decoder will successfully decode the coded data bits.

One drawback of conventional HARQ is that the state of the decoder is not considered in determining the parameters of the retransmission. If the decoder is close to finding on a solution, it may need only a small amount of additional data to successfully decode the transmitted data. On the other hand, if the decoder is still far from finding a solution, then more data may be needed. In the first case, the transmitter may send more data in the retransmission than is needed by the decoder, which wastes resources and creates unnecessary interference. In the second case, the transmitter may not send enough data in the next retransmission, which will result in increased delays.

SUMMARY

The present invention relates to Hybrid Automatic Repeat Request in wireless communication networks. In embodiments of the present invention, information is provided to the transmitter about the state of the decoder so that the transmitter can adapt retransmissions to the current state of the decoder. In some embodiments, a multi-bit feedback is transmitted by the receiver to the transmitter. The multi-bit feedback is determined as a function of the level of convergence reached by the decoder. The transmitter can tailor the selection of the coded data bits for the retransmission as a function of the multi-bit feedback.

Exemplary embodiments comprise methods of data transmission implemented by a transmitter in a wireless communication network. In one exemplary embodiment, the transmitter encodes an information bit stream to generate coded data bits for transmission to a receiver, and transmits a first set of the coded data bits to a receiver during a first data transmission. Thereafter, the transmitter may receive a multi-bit feedback responsive to the first data transmission form the receiver. The multi-bit feedback is a function of a level of convergence reached by a decoder when decoding the coded data bits. In response to the multi-bit feedback, the transmitter selects a second set of coded data bits in dependence on the multi-bit feedback and transmits the second set of coded data bits to the receiver during a second data transmission.

Other embodiments of the invention comprise a transmitter configured to implement a hybrid automatic repeat request. In one embodiment, the transmitter includes a channel coder, a transmit circuit, and a controller. The channel coder includes an encoder to encode an information bit stream to generate a block of coded data bits for transmission to the receiver. The transmit circuit transmits a first set of the coded data bits to the receiving device during a first data transmission, and transmits a second set of the coded bits to the receiving device during a second data transmission. The controller controls the transmission by the transmit circuit. More particularly, the controller receives a multi-bit feedback from the receiving device responsive to the first data transmission. The multi-bit feedback indicates a current state of the decoder. As one example, the multi-bit feedback may indicate or comprise a function of the level of convergence reached by the decoder when the coded data bits were decoded. The controller selects the second set of coded data bits in dependence on the multi-bit feedback.

Embodiments of the present invention enable the retransmission to be tailored to the specific needs of the receiver. Consequently, retransmissions should require fewer resources on average and interference resulting from unnecessary transmissions can be avoided.

DETAILED DESCRIPTION

Figure 1:
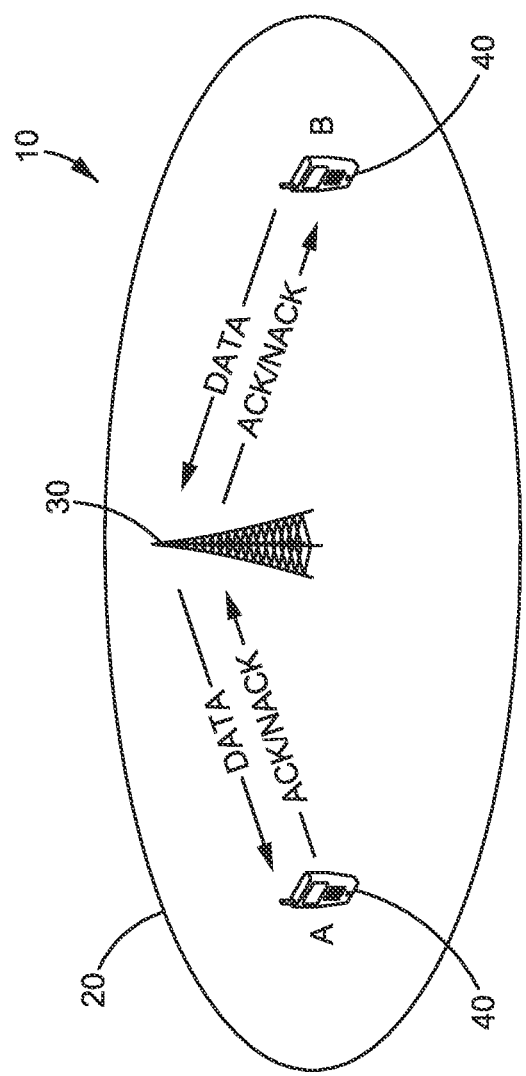
FIG. 1 illustrates an exemplary communication system using hybrid ARQ with variable retransmission energy.

Referring now to the drawings, FIG. 1 illustrates an exemplary wireless communication network 10 using Hybrid Automatic Repeat Request (HARQ). For illustrative purposes, the disclosed embodiment operates according to the Long Term Evolution (LTE) standard. Those skilled in the art will appreciate, however, that the present invention is more generally applicable to any type of wireless communication networks using Hybrid Automatic Repeat Request (HARQ) including, without limitation, Wideband Code Division Multiple Access (WCDMA) networks and Worldwide Interoperability for Microwave Access (WiMAX) networks.

The wireless communication network 10 includes one or more cells 20 providing service in the coverage area of the wireless communication network 10. Although a single cell 20 is illustrated in FIG. 1, the communication network typically contains many cells 20. A base station 30 is located within each cell 20 to provide network access to wireless terminals 40 within the cell 20. Two wireless terminals 40 are shown and denominated by the letters "A" and "B" respectively. Wireless terminal A is receiving user data or control data from the base station 30 over a downlink channel and transmitting acknowledgements of the downlink transmission to the base station 30 over an uplink channel. Similarly, wireless terminal B is transmitting control data or user data over an uplink channel to the base station 30 and receiving acknowledgements of the uplink transmission from the base station over the downlink channel.

Figure 2:
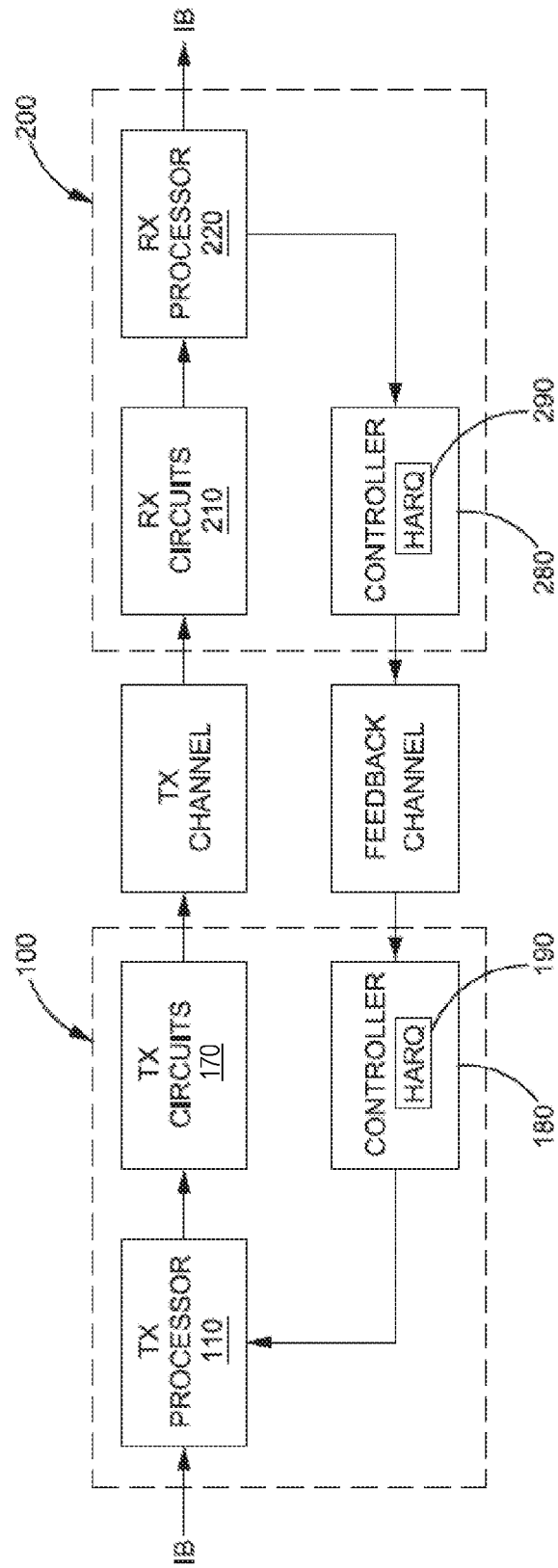
FIG. 2 illustrates an exemplary transmitter and receiver for a wireless communication network using hybrid ARQ with variable retransmission energy.

The base station 30 and each wireless terminal 40 include a transmitter 100 and receiver 200 as shown in FIG. 2. For downlink communications, the transmitter 100 at the base station 30 transmits control or user data over the downlink channel to the receiver 200 at one of the wireless terminals 40. The transmitter 100 at the wireless terminal 40 transmits acknowledgements of the downlink transmissions over the uplink channel to the receiver 200 at the base station 30. For uplink communications, the transmitter 100 at the wireless terminal 40 transmits data to the receiver 200 at the base station 30 over the uplink channel. The transmitter 100 at the base station 30 transmits acknowledgements over the downlink channel to the receiver 200 at the wireless terminal 40.

The transmitter 100 at either the base station 30 or the wireless terminals 40 includes a transmit signal processor 110, a transmit circuit 170 coupled to one or more transmit antennas (not shown), and a controller 180. An information bit stream in digital form is input to the transmit signal processor 110. The transmit signal processor 110 performs error coding to generate coded data bits and maps the coded data bits to complex modulation symbols to generate transmit signals for transmission to the receiver 200. After digital-to analog conversion, the transmit circuits 170 up-convert, filter, and amplify the transmit signals, which are transmitted over the communication channel to the receiver 200. The controller 180 controls the operation of the transmitter 100 according to the applicable communication standard. The functions performed by the controller 180 include HARQ control 190. As will be described herein, the controller 180 receives a multi-bit feedback and determines parameters for retransmissions based on the multi-bit feedback. The multi-bit feedback includes information about the state of a decoder (FIG. 4) at the receiver 200. The transmit signal processor 110 and controller 180 may be implemented with one or more processors, hardware, firmware, or a combination thereof.

The receiver 200 at either the wireless terminal 40 or base station 30 includes receive circuits 210 coupled to one or more receive antennas (not shown), a receive signal processor 220, and controller 280. The receive circuits 210 amplify, filter, and down-convert the received signals to baseband frequency. After analog-to-digital conversion, the receive signal processor 220 demodulates and decodes the received signals. Controller 280 controls operation of the receiver 200 according to the applicable communication standard. The functions performed by the controller 280 include a HARQ control 290. As will be described herein, the controller 280 generates a multi-bit feedback for transmission to the transmitter 100, which provides information to the transmitter 100 about the state of a decoder (see FIG. 4) at the receiver 200. The receive signal processor 220 and controller 280 may be implemented with one or more processors, hardware, firmware, or a combination thereof.

In LTE networks, HARQ with soft combining is employed for both downlink and uplink transmissions in order to increase robustness against data transmission errors that inevitably occur in wireless communication channels. The transmitter 100 at either the base station 30 (downlink) or wireless terminal 40 (uplink) adds error detection bits or check bits to a block of information bits to be transmitted. The added error detection bits enable the detection of data transmission errors by the receiver 200 at the wireless terminal 40 (downlink) or base station 30 (uplink). The transmitter 100 encodes the information bits with the added error detection bits using a forward error correction (FEC) code to obtain a block of coded data bits. The transmitter 100 transmits some or all of the coded data bits to the receiver 200. The receiver 200 decodes the received data and uses the error detection bits to check for uncorrected errors. If the received data is successfully decoded, the receiver 200 sends a positive acknowledgement (ACK) to the transmitter 100 over a reverse control channel. If the received data is not correctly decoded, the receiver 200 can request a retransmission by sending a negative acknowledgement (NACK) to the transmitter 100 over a reverse control channel. During the retransmission, coded data bits representing the same information bits are transmitted.

In conventional HARQ schemes, a single ACK/NACK bit is transmitted from the receiver 200 to the transmitter 100 too indicate the results of decoding. The received data is discarded if uncorrected errors are detected and the same coded data bits transmitted in the initial transmission are repeated in the retransmission. Although the data from the first transmission may not be decodable, it contains useful information that is lost when the data is discarded. This shortcoming is addressed by combining HARQ with soft combining. With soft combining, the received data is saved and combined with data received during the retransmission. The combined data is then decoded.

The type of combining used can be categorized as either Chase combining or Incremental Redundancy (IR) combining. With Chase combining, the same coded data bits transmitted in the initial transmission are repeated in the retransmission. Maximal ratio combining (MRC) or another type of combining is used to combine the data bits received in each transmission to increase the signal-to-noise ratio (SNR) and thereby increase the probability that the data will be successfully decoded.

With incremental redundancy, the set of coded data bits transmitted during the retransmission does not have to be the same as the set of coded data bits transmitted during the original transmission. Instead, multiple sets of coded data bits are generated, with each set representing the same set of information bits. When a retransmission is required, the transmitter 100 typically will send a different set of the coded data bits. The sets of coded bits are referred to as redundancy versions. The receiver 200 combines the bits received in the retransmission with the bits received in the initial transmission. Because the retransmission increases the redundancy, the effective code rate is reduced thereby increasing the chances that the data will be successfully decoded.

Incremental redundancy is typically based on a family of codes known as rate compatible codes. Examples of rate compatible codes include rate compatible convolutional codes (RPCCs) and rate compatible turbo code (RPTCs). Rate compatible codes a set of distinct codes that satisfy the rate compatibility constraint. The rate compatibility constraint requires that all of the coded data bits in higher rate codes are also part of any lower rate codes in the same family. The puncturing patterns are defined to satisfy the rate compatibility constraint.

In the first transmission, a limited number of coded data bits corresponding to a higher rate code are transmitted. Each retransmission provides additional bits resulting in lower effective code rates. As one example, consider a rate ¼ mother code where the bits are equally divided into three redundancy versions. In the first transmission, only 1 in every 3 bits is transmitted yielding an effective code rate after the first transmission of ¾. Each retransmission adds additional bits that results in a lower rate code. Continuing with the same example, after the first retransmission, the code rate will be ⅜, and after the second retransmission the effective code rate will be ¼.

Figure 3:
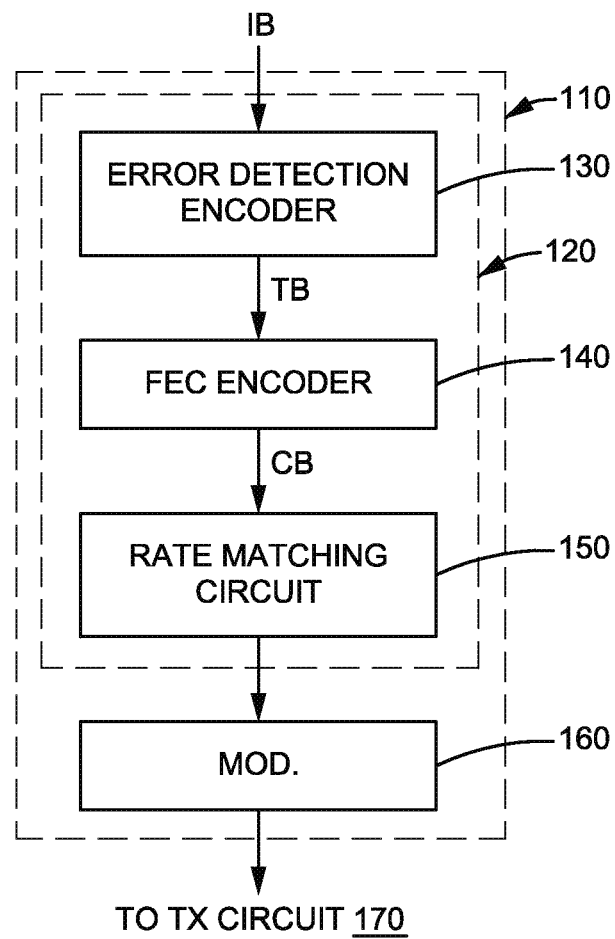
FIG. 3 illustrates an exemplary transmit signal processor for implementing hybrid ARQ.

FIG. 3 illustrates the main functional components of the transmit signal processor involved in HARQ operations. The transmit signal processor 110 includes a channel coder 120 and modulator 160. An information bit stream is input to the channel coder 120. The channel coder 120 encodes the information bit stream to generate a block of coded data bits. The modulator 160 maps the coded data bits to corresponding modulation symbols and modulates a carrier signal to generate a transmit signal, which is output to the transmit circuit 170.

The channel coder 120 includes an error detection encoder 130, a forward error correction (FEC) encoder 140, and a rate matching circuit 150. The error detection encoder 130 receives an information block (IB) containing information bits, generates a set of check bits, and appends the generated bits to the original information bits to generate a transport block (TB). The error detection encoder 130 may, for example, comprise a cyclic redundancy check (CRC) encoder, in which case the check bits may be referred to as CRC bits. The CRC bits enable the receiver 200 to detect uncorrected errors for HARQ operations as hereinafter described. The transport block is input to the FEC encoder 140. The FEC encoder 140 encodes the bits for the transport block using a FEC code to enable correction of at least some bit errors that may occur during data transmission. Exemplary FEC codes applicable to embodiments of the present invention include Turbo codes, low density parity check (LDPC) codes, convolutional codes, and block codes. The FEC encoder 140 outputs a set of coded data bits, referred to herein as a code block (CB). Following FEC encoding, the coded data bits may, in some embodiments, be input to a rate matching circuit 150. Rate matching circuit 150 punctures or repeats some of the coded data bits to generate a specified number of bits needed to match the available channel resources. The number of coded bits output by the rate matching circuit 150 is dependent upon the number of assigned resource blocks, the selected modulation scheme, and the spatial multiplexing order. The coded data bits from the rate matching circuit are then output to the modulator 160.

Figure 4:
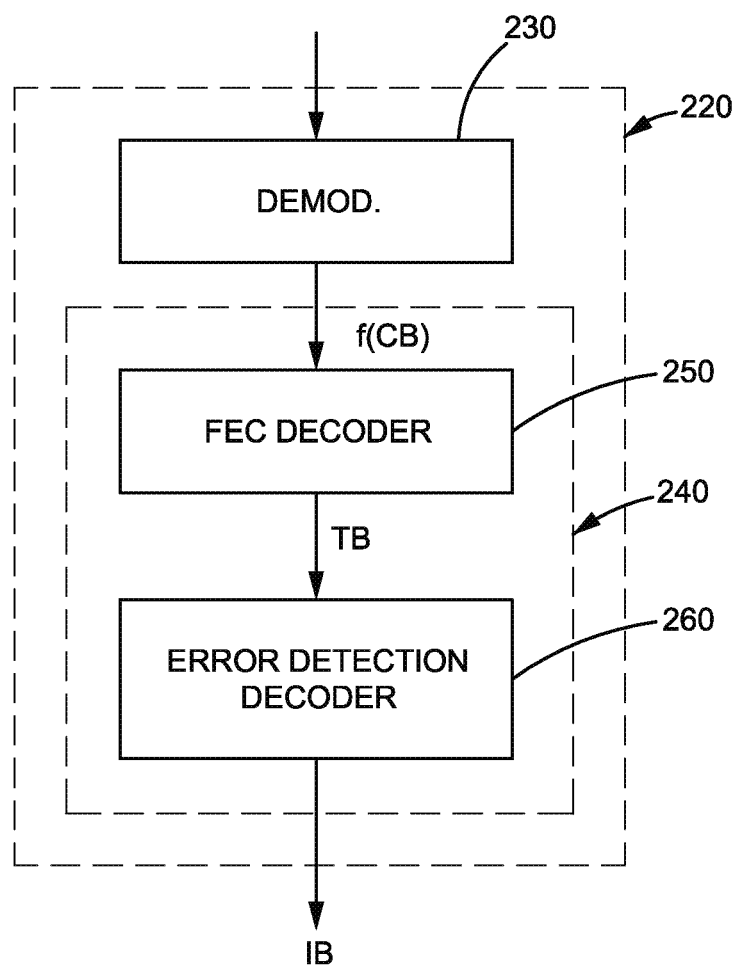
FIG. 4 illustrates an exemplary receive signal processor for implementing hybrid ARQ.

FIG. 4 illustrates the main functional components of the receive signal processor 220 involved in HARQ operations. The receive signal processor 220 includes a demodulator 230 and a channel decoder 240. The demodulator 230 demodulates the received signal and outputs the coded data bits to the channel decoder 240. The coded data bits output by the demodulator 230 are a function of the code block (CB) output by the FEC encoder 140, and include either that entire code block or a subset of that code block. It should be recognized that the coded data bits received may contain some bit errors. The job of the channel decoder 240 is to decode the received data bits to correct any bit errors that might have occurred and to obtain the original information bits (assuming that decoding errors do not occur).

The channel decoder 240 includes an FEC decoder 250 and an error detection decoder 260. The FEC decoder 250 corrects errors that may have occurred during transmission using the FEC code applied at the transmitter 100. The output of the FEC decoder 250 corresponds to the transport block (TB) that was encoded at the transmitter 100. The error detection decoder 260 then checks whether the decoded data stream output from the FEC decoder 250 contains any uncorrected errors using the error detection bits that were appended at the transmitter 100. The results of the decoding and error detection process are input to the controller 280, which generates feedback that is transmitted over a feedback channel to the transmitter 100.

In embodiments of the present invention, instead of sending a single ACK/NACK bit as feedback to indicate the result of decoding, a multi-bit ACK/NACK feedback is generated by the controller 280 and transmitted over a feedback channel from the receiver 200 to the transmitter 100 to indicate a current state of the FEC decoder 250. The additional bits in the feedback enable the transmitter 100 to adapt the parameters of the retransmission to the current state of the FEC decoder 250. For example, the transmitter 100 may determine an amount of energy to apply to the retransmission depending on the current state of the FEC decoder 250. Also, the transmitter 100 may determine the content of the retransmission depending on the current state of the decoder 250.

The exemplary embodiments of the invention described herein are adapted for HARQ schemes using Turbo codes or LDPC codes. For these types of codes, an iterative decoder is typically used as an FEC decoder 250. To briefly summarize, an iterative decoder employs two component decoders that work together to iteratively decode the applied code. The component decoders are both soft-output decoders. During each iteration, "extrinsic information" is output from each of the component decoders and fed to the input of the other component decoder. The "extrinsic information" typically comprises a log-likelihood ratio (LLR) that helps to refine the a priori probability of the data for the next iteration. The component decoders iteratively decode the received data and work toward the same solution. During decoding, a convergence metric is computed to determine how close the soft-output decoders are to convergence. Typically, the number of iterations is preset and decoding can be terminated early if the component decoders converge on a solution.

The specific techniques for calculating the convergence metric are not material to the invention and therefore not described herein in detail. Exemplary techniques for computation of the convergence metric are described in C. Bai, J. Jiang, and P. Zhang, *Hardware implementation of Log-MAP turbo decoder for W-CDMA node B with CRC-aided early stopping*, in Proceedings of IEEE Vehicular Technology Conference (VTC '02), vol. 2, pp. 1016-1019, Birmingham, Ala., USA, May 2002.

In one exemplary embodiment, if the decoding is not successful, the convergence metric is output from the FEC decoder 250 to the controller 280 along with a failure indication. In order to provide a multi-bit feedback, the convergence metric computed at the receiver 200 is quantized and mapped to a multi-bit feedback. For example, assuming that the convergence metric comprises a value between 0 and 1 indicating the probability of converging, the multi-bit feedback may comprise a four-bit value indicating one of four probability ranges as shown in Table 1.

TABLE 1

Mapping and Quantization of Convergence Metric

| Convergence Metric | Multi-Bit Feedback |
|---|---|
| 0-.24 | 00 |
| .25-.49 | 01 |
| .50-.74 | 10 |
| .75-1.0 | 11 |

The multi-bit feedback provides information to the transmitter 100 about the state of the FEC decoder 250. This information, referred to herein as convergence information, is useful because a FEC decoder 250 that is close to converging requires less new information than a FEC decoder 250 that is far from converging. The convergence information can thus be used to tailor the retransmission to the needs of the FEC decoder 250. In some embodiments of the invention, the convergence information is used at the transmitter 100 to select the coded data bits that are included in the retransmission depending on the level of convergence reached by the decoder. The bit selection process takes advantage of the fact that some of the coded bits are more important than others. For example, with Turbo codes, the systematic bits have higher importance to the decoder than the parity bits. Hence, the initial transmission will typically include the systematic bits of higher importance along with some parity bits. If the initial transmission is received with poor quality, it may be more beneficial to retransmit the systematic bits than to transmit additional parity bits. Therefore, HARQ schemes using incremental redundancy can benefit from a multi-bit feedback that provides more information about the state of the decoder.

In some embodiments, the receiver 200 may combine the convergence information with other information to generate the multi-bit feedback. As one example, the multi-bit feedback may be determined based on the level of convergence reached by the FEC decoder 250 and on channel conditions. A receiver 200 at a wireless terminal 40 normally estimates channel conditions and provides channel quality feedback to a scheduler at the transmitter. A convergence metric and channel quality metric may be weighted and combined to generate a combined metric that is then quantized and mapped to a multi-bit feedback. As another example, a receiver 100 at a base station may estimate its current load and generate a load metric that is combined with the convergence information, channel information or both.

The multi-bit feedback is transmitted by the receiver 200 to the transmitter 100. The transmitter 100 is configured to select a set of coded data bits for a retransmission based on the multi-bit feedback. In some embodiments of the invention, incremental redundancy is used and the transmitter 100 selects a redundancy version of the coded data bits for the retransmission depending on the multi-bit feedback. This is in contrast to conventional HARQ schemes where the selection of the redundancy version is typically fixed for each transmission. Each redundancy version comprises a different set of coded data bits. In some embodiments, each redundancy version comprises a distinct set of the coded data bits. In other embodiments, the redundancy version may comprise overlapping subsets of the coded data bits. Each redundancy version may have the same number of coded data bits, or the redundancy version may have different numbers of coded data bits. Depending on the multi-bit feedback, which is indicative of the level of convergence reached by the FEC decoder 250, the controller 180 at the transmitter 100 may elect to send the same redundancy version during the retransmission, or a different redundancy version. Sending the same redundancy version results in a petition of the previously transmitted bits, which may be more beneficial than sending new parity bits if the original transmission was received with poor quality.

In other embodiments of the invention, the transmitter 100 may select a puncturing pattern or bit repetition pattern used by the rate matching circuit depending on the multi-bit feedback. The transmitter 100 may have a predetermined set of bit puncturing and bit repetition patterns from which to choose. Depending on the multi-bit feedback, the controller 180 at the transmitter 100 may select one of the candidate bit puncturing or bit petition patterns. This technique can be applied to both Chase combining and incremental redundancy.

In the case of Chase combining, all of the bits in the retransmission will comprise previously transmitted bits. Some of the previously transmitted bits may be punctured in the retransmission according to the selected bit repetition pattern. Alternatively, some of the previously transmitted bits may be repeated twice in the retransmission according to a selected bit repetition pattern. The transmitter 100 may also use a combination of bit puncturing and bit repetition where some previously transmitted bits are punctured and some are repeated two or more times in the retransmission.

In systems using incremental redundancy, it will be recognized that the different redundancy versions correspond to different puncturing patterns. If all of the puncturing patterns correspond to one of the possible redundancy versions, selecting the bit puncturing pattern is equivalent to selecting a redundancy version. In other embodiments, however, bit puncturing or bit repetition may be applied to a selected redundancy version. For example, if RV2 is selected, then selected bits of RV2 can be punctured or repeated. In some embodiments, each redundancy version may have different sets of candidate bit puncturing and bit repletion patterns. The transmitter 100 selects from among the candidate patterns for the selected redundancy version.

Repeating or puncturing coded data bits results in a variable number of coded data bits in the retransmission, which in turn results in a time varying duration for the retransmission. In systems where the resource allocation for the retransmission is fixed, the maximum number of bits that can be included in the retransmission will be determined by the amount of the allocated resources. If less than the maximum number of bits is used for the retransmission, the transmitter 100 can reduce the number of resource elements used for the retransmission by varying the time duration of the retransmission, varying the number of subcarriers used for the retransmission, or a combination thereof. In code division multiple access (CDMA) systems, the transmitter 100 can vary the number of spreading codes used for the retransmission. Because no transmission occurs in the unused resource, interference with other users is reduced.

Figure 5:
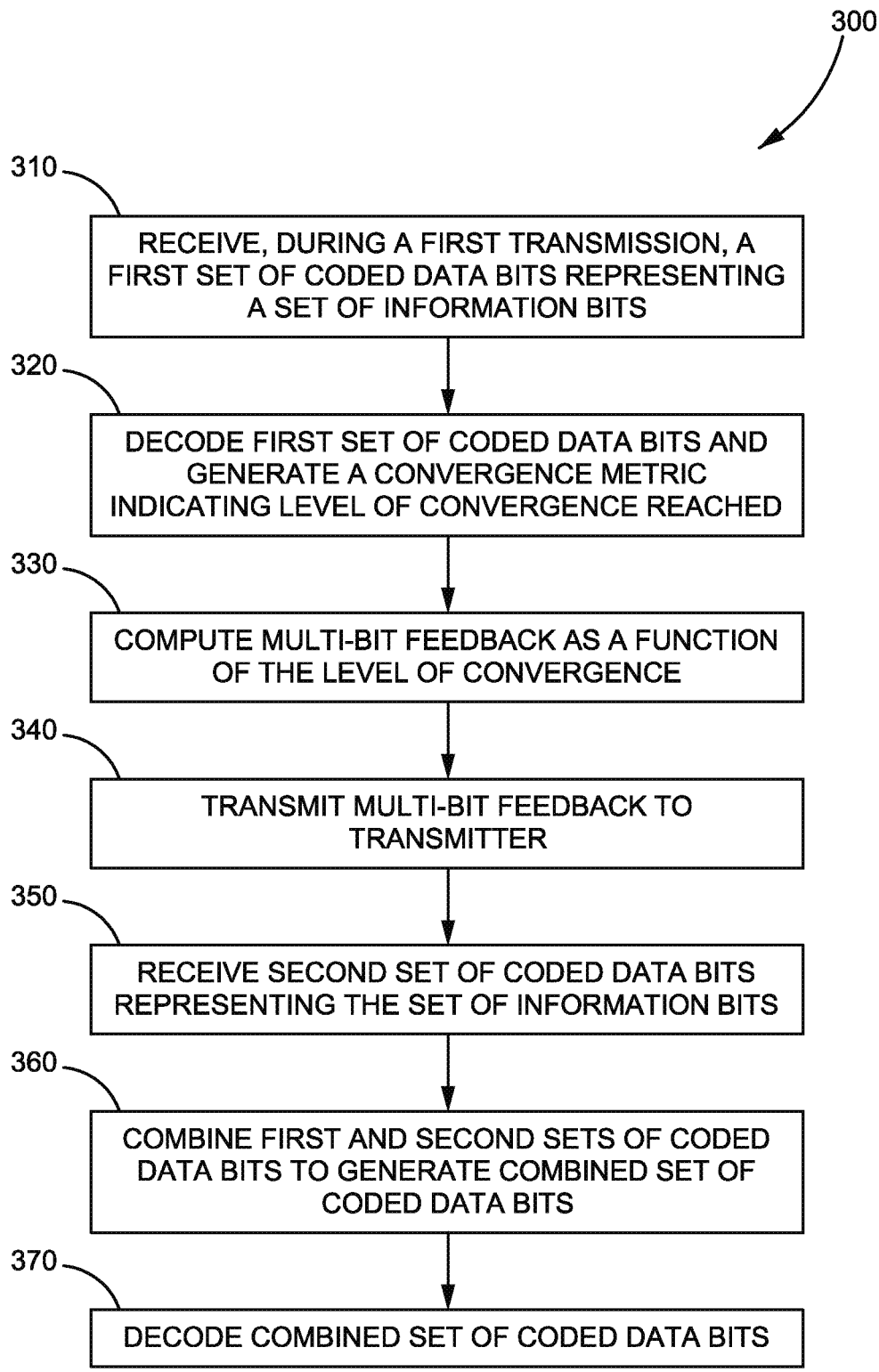
FIG. 5 illustrates an exemplary method of data reception using variable retransmission energy.

FIG. 5 illustrates an exemplary method 300 implemented by a receiver 200 in one embodiment of the invention. The receiver 200 may be located in either a base station 30 or wireless terminal 40. The receiver 200 receives a first set of coded data bits from a transmitter 100 during a first data transmission (block 310). The first set of coded data bits represents a set of information bits in an information bit stream. The receiver 200 decodes the first set of coded data bits and generates a convergence metric indicating a level of convergence reached by a decoder (block 320). The receiver 200 computes a multi-bit feedback as a function of the convergence metric (block 330) and transmits the multi-bit feedback to the transmitter (block 340). The receiver 200 may also receive a second set of coded data bits representing the information bits from the transmitter 100 during a second data transmission (block 350). The second set of data bits may be a repetition of the first set of data bits, or may comprise new coded data bits. The receiver combines the first and second set of data bits to generate a combined set of data bits (block 360). The combined set of data bits is then decoded by the receiver 200 (block 370).

Figure 6:
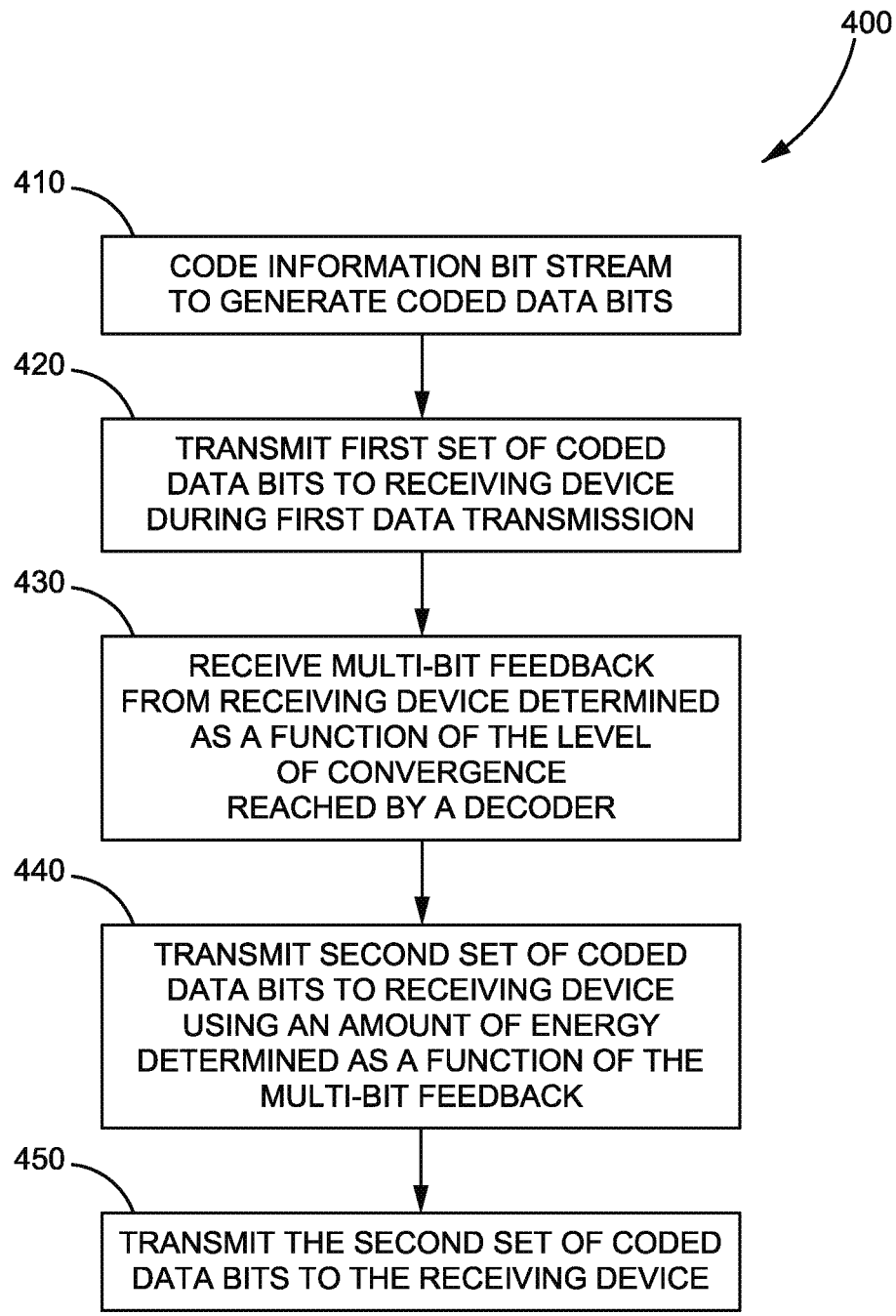
FIG. 6 illustrates an exemplary method of data transmission with feedback dependent bit selection.

FIG. 6 illustrates an exemplary method 400 implemented by a transmitter 100 in one embodiment of the present invention. The transmitter 100 may be located in either a base station 30 or wireless terminal 40. The transmitter 100 codes an information bit stream to generate a block of coded data bits (block 410). In one embodiment, error detection bits such as cyclic redundancy check code (CRC) bits, are appended to the information bits. The information bits with appended error detection bits are then encoded using an FEC code, such as a Turbo code or LDPC code. During an initial transmission, a first set of the coded data bits are transmitted to the receiver 200, which may be located at a wireless terminal 40 (downlink) or base station 30 (uplink) (block 420). In some embodiments, e.g. where Chase combining is used, the first set of coded data bits may comprise the entire block of coded data bits. In other embodiments, e.g. where incremental redundancy is used, the first set of coded data bits may comprise a subset of the coded data bits generated during the coding process. Subsequently, the transmitter 100 receives a multi-bit feedback from the receiver 200 which is determined as a function of a level of convergence reached by a decoder when the coded data bits were decoded (block 430). In response to the multi-bit feedback, the transmitter 100 selects a second set of coded data bits depending on the multi-bit feedback and transmits the second set of coded data bits to the receiver (block 440). In some embodiments, the transmitter may use the multi-bit feedback to select a redundancy version of the coded data bits for the retransmission. The selected redundancy version may comprise a repetition of the first data transmission, or may comprise a different redundancy version with additional coded data bits. In other embodiments of the invention, the transmitter 100 may use the multi-bit feedback to select a bit puncturing or bit repetition pattern to apply to a set of the coded data bits. The bit puncturing pattern or bit repetition pattern can be applied to the full set of coded data bits output by the FEC encoder, or to a subset (i.e. redundancy version) of the coded data bits.

The use of multi-bit feedback and variable bit selection depending on the multi-bit feedback enables the transmitter 100 to tailor retransmissions to the specific needs of the receiver 200. Consequently, use of resources for HARQ can be reduced and unnecessary interference with other users may be avoided.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A data retransmission method implemented at a transmitter, said method comprising:
    coding an information bit stream to generate coded data bits for transmission to a receiver;
    transmitting a first set of the coded data bits to the receiver during a first data transmission;
    receiving, from the receiver, a multi-bit feedback responsive to the first data transmission, wherein the multi-bit feedback indicates a level of convergence reached by a decoder when decoding the first set of the coded data bits; and
    selecting, responsive to the multi-bit feedback, a second set of the coded data bits as a function of the level of convergence of the decoder and transmitting the second set of the coded data bits to the receiver during a second data transmission.

2. The data retransmission method of claim 1 wherein selecting the second set of the coded data bits comprises selecting between two or more redundancy versions of the coded data bits depending on the level of convergence.

3. The data retransmission method of claim 2 wherein one of the redundancy versions comprises a repetition of the first set of the coded data bits.

4. The data retransmission method of claim 1 wherein selecting the second set of the coded data bits comprises puncturing or repeating selected ones of the coded data bits as a function of the level of convergence to generate the second set of the coded data bits.

5. The data retransmission method of claim 4 wherein selecting the selected ones of the coded data bits for puncturing or repeating comprises selecting a bit puncturing or bit repetition pattern from a predetermined set of bit puncturing and bit repetition patterns.

6. The data retransmission method of claim 1 wherein selecting the second set of the coded data bits comprises:
    selecting a redundancy version of the coded data bits; and
    puncturing or repeating selected ones of the coded data bits in the selected redundancy version as a function of the level of convergence to generate the second set of the coded data bits.

7. The data retransmission method of claim 6 wherein selecting the selected ones of the coded data bits in the selected redundancy version for puncturing or repeating comprises selecting a bit puncturing or bit repetition pattern from a predetermined set of bit puncturing and bit repetition patterns.

8. The data retransmission method of claim 1 further comprising transmitting the second set of the coded data bits using less than all of the resources allocated for the second data transmission.

9. The data retransmission method of claim 8 wherein transmitting the second set of the coded data bits using less than all of the resources allocated for the second data transmission comprises transmitting the second set of the coded data bits in fewer symbol periods than are allocated for the second data transmission.

10. The data retransmission method of claim 8 in an orthogonal frequency division multiplexing (OFDM) system wherein transmitting the second set of the coded data bits using less than all of the resources allocated for the second data transmission comprises transmitting the second set of the coded data bits on fewer subcarriers than are allocated for the second data transmission.

11. The retransmission method of claim 8 in a code division multiple access (CDMA) system wherein transmitting the second set of the coded data bits using less than all of the resources allocated for the second data transmission comprises varying a number of spreading codes used for the second data transmission.

12. A transmitter in a wireless communication network, said transmitter comprising:
an encoder to encode an information bit stream to generate a block of coded data bits for transmission to a receiver;
a transceiver to transmit a first set of the coded data bits to the receiver during a first data transmission and to transmit a second set of the coded bits to the receiver during a second data transmission; and
a controller configured to:
receive via said transceiver a multi-bit feedback from the receiver responsive to the first data transmission, wherein the multi-bit feedback indicates a level of convergence reached by a decoder when decoding the first set of the coded data bits; and
select, responsive to the multi-bit feedback, the second set of the coded data bits to be transmitted as a function of the level of convergence of the decoder.

13. The transmitter of claim 12 wherein the controller is configured to select between two or more redundancy versions of the coded data bits depending on the level of convergence.

14. The transmitter of claim 13 wherein one of the redundancy versions comprises a repetition of the first set of the coded data bits.

15. The transmitter of claim 12 wherein the controller is configured to select one or more of the coded data bits to be punctured or repeated as a function of the level of convergence to generate the second set of the coded data bits.

16. The transmitter of claim 15 wherein the controller is configured to select a bit puncturing or bit repetition pattern from a predetermined set of bit puncturing and bit repetition patterns.

17. The transmitter of claim 12 wherein the controller is configured to:
select a redundancy version of the coded data bits; and
select one or more of the coded data bits in the selected redundancy version to be punctured or repeated as a function of the level of convergence to generate the second set of the coded data bits.

18. The transmitter of claim 17 wherein the controller is configured to select a bit puncturing or bit repetition pattern from a predetermined set of bit puncturing and bit repetition patterns.

19. The transmitter of claim 12 wherein the controller is configured to control the transmission of the second set of the coded data bits to use less than all of the resources allocated for the second data transmission.

20. The transmitter of claim 19 wherein the controller is configured to control the transmission of the second set of the coded data bits to use fewer symbol periods than are allocated for the second data transmission.

21. The transmitter of claim 19 for an orthogonal frequency division multiplexing (OFDM) system wherein the controller is configured to control the transmission of the second set of the coded data bits to use fewer subcarriers than are allocated for the second data transmission.

22. The transmitter of claim 19 for a code division multiple access (CDMA) system wherein the controller is configured to vary a number of spreading codes used for the second data transmission.

* * * * *